United States Patent
Park et al.

(10) Patent No.: US 9,353,724 B2
(45) Date of Patent: May 31, 2016

(54) GENERATOR AND BIDET COMPRISING THE SAME

(75) Inventors: Man-Uk Park, Seoul (KR); Sung-Worl Jin, Seoul (KR); Young-Sang Yun, Seoul (KR); Ji-Hye Jeong, Seoul (KR); In-Seok Seo, Seoul (KR); Ki-Chul Kim, Seoul (KR); Joung-Ho Son, Seoul (KR)

(73) Assignee: Woongjin Coway Co., Ltd (KR)

( * ) Notice: Subject to any disclaimer, the term of this patent is extended or adjusted under 35 U.S.C. 154(b) by 844 days.

(21) Appl. No.: 13/640,449

(22) PCT Filed: Sep. 30, 2010

(86) PCT No.: PCT/KR2010/006666
§ 371 (c)(1),
(2), (4) Date: Oct. 10, 2012

(87) PCT Pub. No.: WO2011/129499
PCT Pub. Date: Oct. 20, 2011

(65) Prior Publication Data
US 2013/0025041 A1    Jan. 31, 2013

(30) Foreign Application Priority Data

Apr. 15, 2010 (KR) .................... 20-2010-0003980 U
Sep. 27, 2010 (KR) ........................ 10-2010-0093439

(51) Int. Cl.
*A47K 3/022* (2006.01)
*F03B 1/00* (2006.01)
*E03D 9/08* (2006.01)
*H02K 7/18* (2006.01)

(52) U.S. Cl.
CPC ... *F03B 1/00* (2013.01); *E03D 9/08* (2013.01); *H02K 7/1823* (2013.01); *F05B 2220/7068* (2013.01); *Y02E 10/223* (2013.01); *Y02E 10/28* (2013.01)

(58) Field of Classification Search
USPC ............................................. 4/597
See application file for complete search history.

(56) References Cited

U.S. PATENT DOCUMENTS 4,616,298 A * 10/1986 Bolson ............ 362/192
2005/0246828 A1* 11/2005 Shirai et al. .................. 4/420.4

FOREIGN PATENT DOCUMENTS

| CN | 2371721 | 3/2000 |
| CN | 2432723 | 5/2001 |
| CN | 201116508 | * 9/2008 |

(Continued)

OTHER PUBLICATIONS

CN 20116508 and translation of CN 201116508.*

(Continued)

*Primary Examiner* — Lauren Crane
(74) *Attorney, Agent, or Firm* — The Farrell Law Firm, P.C.

(57) ABSTRACT

A generator includes: an upper housing and a lower housing; a water inlet and a water outlet provided in the upper housing; an impeller rotatably fixed inside the upper housing; a magnet provided in the lower housing, connected to a rotating shaft of the impeller, and rotated integrally with the impeller; and a bobbin positioned outside the magnet. A bearing through which the rotating shaft passes and a communication hole connecting a space for housing the impeller to a space for housing the magnet are disposed in an intermediate surface between the space for housing the impeller and the space for housing the magnet.

13 Claims, 3 Drawing Sheets

(56) References Cited

FOREIGN PATENT DOCUMENTS

| | | | |
|---|---|---|---|
| EP | 0433631 A1 | * | 11/1990 |
| JP | 2002201680 | | 7/2002 |
| JP | 2002294778 | | 10/2002 |
| JP | 2003138620 | | 5/2003 |
| JP | 2004183255 | | 7/2004 |
| JP | 2008-245381 | | 10/2008 |

OTHER PUBLICATIONS

PCT/ISA/210 Search Report issued on PCT/KR2010/006666 (pp. 3).
PCT/ISA/237 Written Opinion issued on PCT/KR2010/006666 (pp. 4).

* cited by examiner

GENERATOR AND BIDET COMPRISING THE SAME

TECHNICAL FIELD

The present invention relates to a generator, and more particularly, to a small generator which generates power by rotating an impeller by using water pressure, has a low loss with regard to an eddy current loss, and is easily manufactured, and a bidet comprising the same.

BACKGROUND ART

Conventionally, a self-power generating type bidet has been known, which generates power by using water introduced into a ceramic tank and supplies the generated power as a power to be used for the bidet.

However, the generator of the bidet is installed in a flow path of water introduced to the ceramic tank, and the power generated by the generator is used for the bidet. Therefore, the quantity of generated may be insufficient.

The generator used in the bidet is operated by the pressure of water supplied to a pipe of a toilet. FIG. 1 shows the construction of the generator using water pressure.

Referring to FIG. 1, the generator 10 includes a housing 11, an impeller 20, a shaft 30, a seal unit 17, a magnet (rotor) 40, and a bobbin (stator) 51. The housing 11 includes a water inlet 12 and a water outlet 13. The impeller 20 is rotatably fixed inside the housing 11. The shaft 30 is connected to the impeller 20. The seal unit 17 is closely attached to the shaft 30 to seal the shaft 30 such that water inside the housing 11 does not flow into the magnet 40. The magnet 40 is rotated integrally with the impeller 20 through the shaft 30. The bobbin 51 is disposed to surround the magnet 40.

In such a generator 10, the impeller 20 is rotated by the pressure of water introduced from a water supply source 15 through the water inlet 12. As the impeller 20 is rotated, the magnet 40 is rotated integrally with the impeller 20 to generate a current in the coil bobbin 51 serving as the stator.

At this time, the seal unit 17 of the generator 10 prevents the water rotating the impeller 20 from flowing into the magnet 40. However, the friction between the rotating shaft 30 and the seal unit 17 may interfere with the rotation of the shaft. Therefore, power generation efficiency may be decreased.

In order to solve such a problem, a generator has been developed (refer to FIG. 2). Although the magnet 40 comes in contact with water, it does not have an effect upon power generation. Therefore, the seal unit 17, positioned at the portion through which the shaft 30 passes in the housing 11, is removed from the generator, and a housing 16 for preventing water from flowing into the bobbin 51 is formed in the generator. However, when the housing 11 is constructed in such a manner, the housing is positioned between the magnet 40 and the bobbin 51, and internal pressure (water pressure) is applied to the housing. When the thickness of the housing is increased to endure the internal pressure of the housing, the distance between the bobbin 51 and the magnet 40 is increased. Then, the power generation efficiency may decrease. Therefore, the magnet 40 may be disposed in a housing formed of a metal. In this case, stability against internal pressure may be secured, and the distance between the bobbin 51 and the magnet 40 may be reduced.

As described above, when the housing is formed of a metal, stability against internal pressure may be secured owing to the small thickness thereof. However, the power generation efficiency may decrease due to an eddy current loss caused by the metal.

DISCLOSURE OF INVENTION

Technical Problem

An object of the present invention is to provide a generator which secures stability against internal pressure and of which the power generation efficiency is not reduced by an eddy current loss.

Another object of the present invention is to provide a generator which is used in a bidet and generates a large amount of power.

Solution to Problem

According to an aspect of the present invention, there is provided a generator. The generator includes: an upper housing and a lower housing; a water inlet and a water outlet provided in the upper housing; an impeller rotatably fixed inside the upper housing; a magnet provided in the lower housing, connected to a rotating shaft of the impeller, and rotated integrally with the impeller; and a bobbin positioned outside the magnet. The generator includes further a through-hole through which the rotating shaft passes is formed in the upper housing to have a larger diameter than the rotating shaft, and the bobbin is formed integrally in the lower housing by injection molding The generator may includes a bearing which is disposed at the through-hole and one or more communication holes which connect a space for housing the impeller to a space for housing the magnet and which are disposed in an intermediate surface between the space for housing the impeller and the space for housing the magnet.

The communication holes may have a diameter of 1-1.5 mm.

A bottom portion of the lower housing formed integrally with the bobbin may have a larger thickness than a portion between the bobbin and the magnet in the lower housing.

The portion between the bobbin and the magnet in the lower housing formed integrally with the bobbin may be formed to have a thickness of 0.5-1 mm. The bottom portion of the lower housing formed integrally with the bobbin may be formed to have a thickness of 2 mm or more.

The water outlet may be divided into two or more parts such that water passing through the generator is supplied through the divided water outlets.

According to another aspect of the present invention, there is provided a bidet including a bidet body. The bidet body includes: a generator; an injection nozzle connected to a water outlet of the generator, receiving water from the water outlet of the generator, and injecting the received water; a charge unit storing power from the generator; and a control unit receiving power from the charge unit and controlling the injection nozzle. The generator includes: an upper housing and a lower housing; a water inlet and the water outlet provided in the upper housing; an impeller rotatably fixed in the upper housing; a magnet provided in the lower housing, connected to a rotating shaft of the impeller, and rotated integrally with the impeller; and a bobbin positioned outside the magnet, and the generator includes further a through-hole through which the rotating shaft passes is formed in the upper housing to have a larger diameter than the rotating shaft, and the bobbin is formed integrally in the lower housing by injection molding.

The generator may includes a bearing which is disposed at the through-hole and one or more communication holes which connect a space for housing the impeller to a space for housing the magnet and which are disposed in an intermediate surface between the space for housing the impeller and the space for housing the magnet.

The injection nozzle may include a bidet nozzle and a cleaning nozzle, the bidet body may further include a flow path switching device provided between the generator and the bidet and cleaning nozzles and switching paths of the bidet and cleaning nozzles, and the control unit may control the flow path switching device with the injection nozzle.

The water inlet may be connected to a pipe of a toilet, and the water outlet may be divided into a first water outlet for supplying water to a ceramic tank and a second water outlet for supplying water to the injection nozzle.

The first water outlet connected to the ceramic tank may have a larger inner diameter than the second water outlet connected to the injection nozzle. The ratio of the inner diameter of the first water outlet connected to the ceramic tank and the inner diameter of the second water outlet connected to the injection nozzle may be 1:1.2-5.

Advantageous Effects of Invention

According to the embodiments of the present invention, it is possible to provide a generator which exhibits excellent power generation efficiency and has stability against internal pressure.

Furthermore, it is possible to provide a bidet in which power generation efficiency is improved and in which the amount of water used therein is increased to improve the quantity of power generated.

BRIEF DESCRIPTION OF DRAWINGS

The above and other aspects, features and other advantages of the present invention will be more clearly understood from the following detailed description taken in conjunction with the accompanying drawings, in which.

BEST MODE FOR CARRYING OUT THE INVENTION

Figure 1:
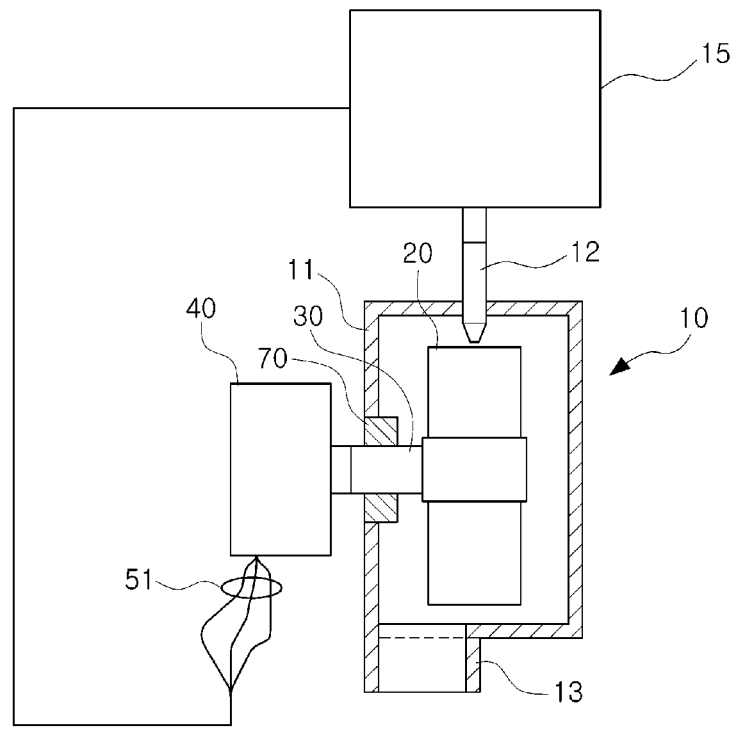
FIG. 1 is a diagram illustrating a conventional generator using water pressure.
Figure 2:
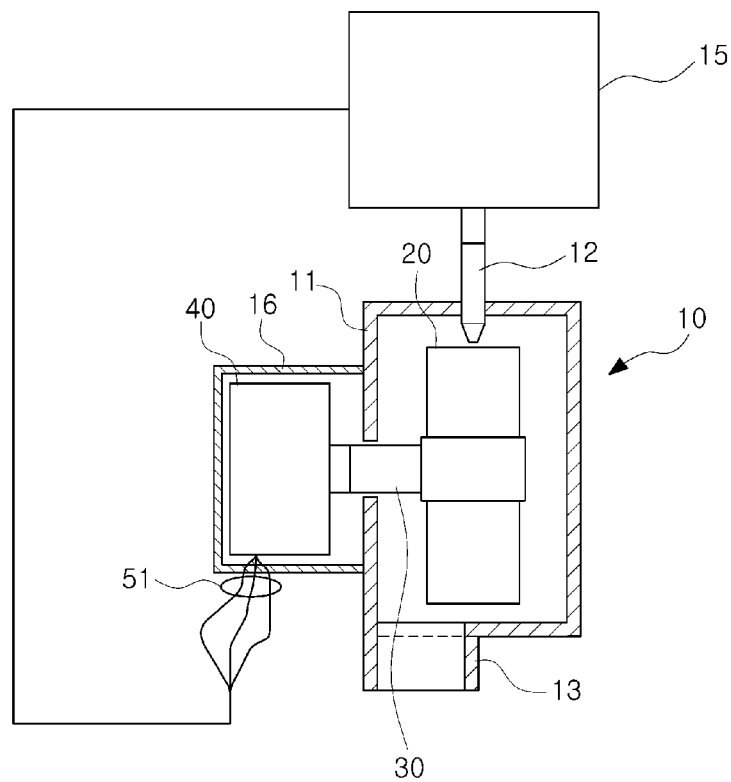
FIG. 2 is a diagram illustrating another conventional generator constructed by improving the generator of FIG. 1.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals in the drawings denote like elements, and thus their description will be omitted.

In the exemplary embodiments of the present invention, it will be described that water is introduced into a generator. Without being limited thereto, however, any fluids (liquids or gases) may be applied to the generator according to the embodiments of the present invention.

Figure 3:
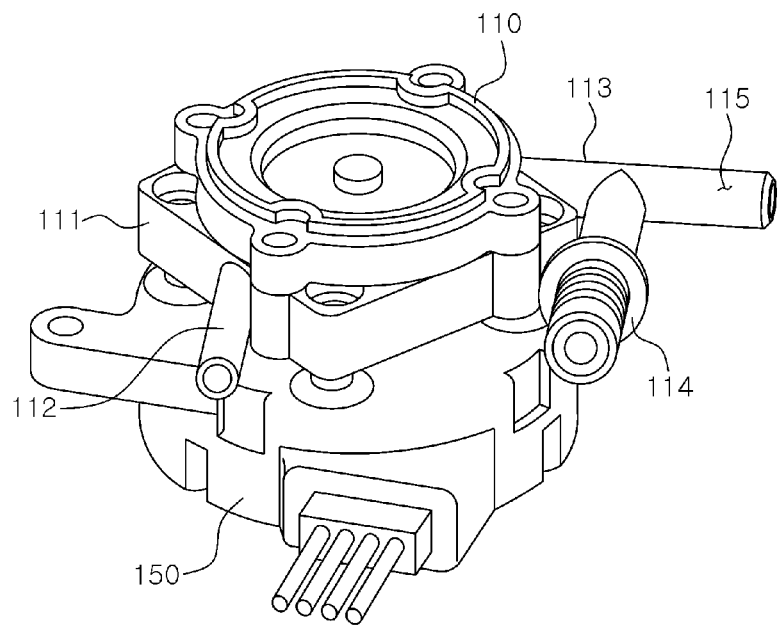
FIG. 3 is a perspective view of a generator according to a first embodiment of the present invention.

FIG. 3 is a perspective view of a generator 100 according to a first embodiment of the present invention. The generator 100 includes a lid 110, an upper housing 111, and a lower housing 150 which are coupled through screws. The upper housing 111 includes a water inlet 112 and a water outlet 113.

The water outlet 113 of the upper housing 111 is divided into a first water outlet 114 and a second water outlet 115. A certain amount of water passing through the generator 100 flows into a ceramic tank through the first water outlet 114, and the remainder of the water flows into a bidet body through the second water outlet 115. The first and second water outlets will be described below with reference to FIG. 5.

Figure 4:
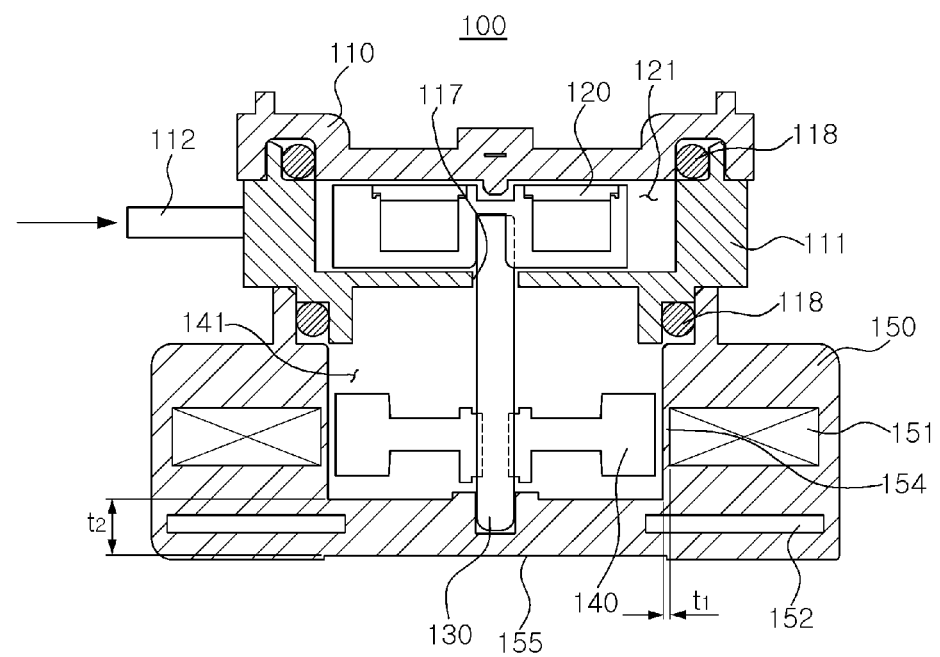
FIG. 4 is a cross-sectional view of the generator according to the first embodiment of the present invention.

FIG. 4 is a cross-sectional view of the generator 100 of FIG. 3.

As described above, the lid 110 and the upper housing 111 are coupled to each other through screws. Between the lid 110 and the upper housing 111, a seal 118 is positioned to prevent water from flowing into a gap between the lid 110 and the upper housing 111. The upper housing 111 includes the water inlet 112 and the water outlet 113 (refer to FIG. 3) and has a through-hole 117 through which a rotating shaft 130 having an impeller 120 mounted thereon passes.

Inside the upper housing 111, the impeller 120 is positioned. The impeller 120 may be rotated by receiving water pressure from the water inlet 112. The water introduced from the water inlet 112 rotates the impeller 120 and then flows into the water outlet 113.

In the upper housing 111, the through-hole 117 through which the rotating shaft 130 passes is formed to have a larger diameter than the rotating shaft 130. Since the diameter of the through hole 117 is larger than that of the rotating shaft 130, the through-hole 117 does not have an effect upon the rotation of the rotating shaft 130. Furthermore, since the diameter of the through-hole 117 is larger than that of the rotating shaft 130, water may flow from a space 121 where the impeller 120 is positioned into a space 141 of the lower housing 150 where a magnet 140 is positioned, through the gap between the through-hole 117 and the rotating shaft 117.

The impeller 120 is coupled to the rotating shaft 130 such that the impeller 120 and the rotating shaft 130 may be integrally rotated. In this embodiment of the present invention, the impeller 120 and the rotating shaft 130 are coupled to each other in a key manner. However, as long as the impeller 120 and the rotating shaft 130 are integrally rotated, they may be coupled in another manner.

Under the upper housing 111, the lower housing 150 is positioned. As illustrated in FIG. 3, the upper and lower housings 111 and 150 are coupled through screws. Between the upper and lower housings 111 and 150, the seal 118 is positioned to prevent water from flowing into the gap between the upper and lower housings 111 and 150.

The magnet 140 connected to the rotating shaft 130 is positioned in the space 141 of the lower housing 150. As described above, the space 141 communicates with the spaces 118 of the upper housing 111. When water is introduced into the generator 100, the space 141 is filled with the water. Therefore, internal pressure caused by the introduced water is also applied to the space 141 of the lower housing 150.

The magnet 140 is coupled to the rotating shaft 130 such that they may be rotated integrally. Therefore, as the impeller 120 is rotated, the impeller 120 and the magnet 140 are rotated together. Furthermore, the magnet 140 is coupled to the rotating shaft 130 at a position corresponding to a bobbin 151 inside the lower housing 150.

Inside the lower housing 150, the bobbin 151 having a coil wound therearound and a printed circuit board (PCB) 152 connected to the bobbin 151 are positioned. In this embodiment of the present invention, the bobbin 151 and the PCB 152 are formed in the lower housing 150 by insert injection molding.

Since the lower housing 150 is insert-injection-molded, a portion 154 between the bobbin 151 and the magnet 140 in the lower housing 150 may be formed to a small thickness. Therefore, it is possible to prevent a loss caused by an eddy current loss, different from a housing formed of a metal.

When the thickness t1 of the portion 154 between the bobbin 151 and the magnet 140 in the housing 150 exceeds 1 t (1 mm), the power generation efficiency may decrease. Furthermore, the thickness t1 of the portion 154 needs to be set to at least 0.5 t, in order to endure the internal pressure.

In this embodiment of the present invention, a lower portion 155 of the lower housing 150 corresponding to the bottom surface of the generator 100 is formed to have a larger thickness than that of the portion 154 between the bobbin 151 and the magnet 140. When the thickness t2 of the lower portion 155 of the lower housing 150 is equal to or more than 2 t, strength reinforcement against the internal pressure may be achieved.

Figures 5, 6:
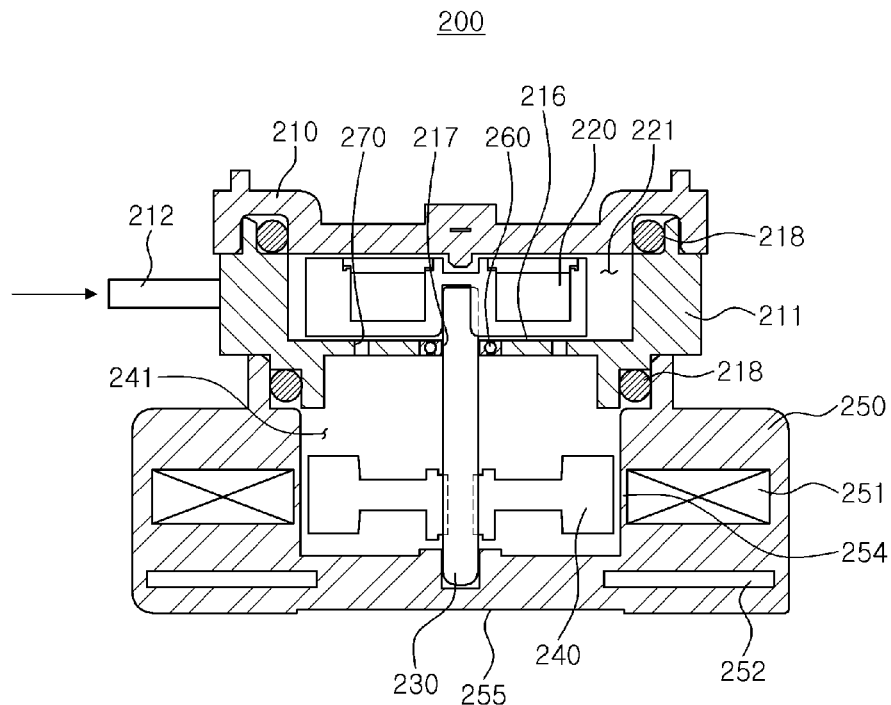
FIG. 5 is a cross-sectional view of a generator according to a second embodiment of the present invention.
FIG. 6 is a schematic view of a bidet in which the generator according to the embodiments of the present invention is used.

FIG. 5 is a cross-sectional view of a generator 200 according to a second embodiment of the present invention.

Referring to FIG. 5, the generator 200 according to the second embodiment of the present invention has the same structure as that of the generator according to the first embodiment of the present invention, except for the communication relation between an upper housing 211 and a lower housing 250. In the second embodiment of the present invention, a lid 210 and the upper housing 211 are coupled with a seal 218 interposed therebetween, the upper housing 211 including a water inlet 212 and a water outlet (not illustrated) has a through-hole 217 through which a rotating shaft 230 having an impeller 220 mounted thereon passes, and the impeller 220 and the rotating shaft 230 are coupled to each other such that they may be rotated integrally.

Inside the housing 211, the impeller 220 is positioned. The impeller 220 may be rotated by receiving water pressure from the water inlet 212. The water introduced from the water inlet 212 rotates the impeller 220 and then flows into the water outlet.

The through-hole 217 of the upper housing 211 has a bearing 260 disposed therein, through which the rotating shaft 230 passes. Therefore, the bearing 260 may remove concern about a power generation loss caused by friction which may occur between the rotating shaft 230 and the through-hole 217.

Meanwhile, since a gap exists between the bearing 260 and the rotating shaft 230, water may be introduced into a space 241 of the lower housing 250 where the magnet 240 is positioned from a space 221 where the impeller 220 is positioned. However, since the gap between the bearing 260 and the rotating shaft 230 is small, the amount of water introduced through the gap is limited. Therefore, when the generator 200 is initially driven, the impeller 220 may be inclined to an intermediate surface 216 of the upper housing 211 by a pressure difference between the space 221 of the upper housing 211 and the space 241 of the lower housing 211. In this case, friction occurs between the lower surface of the impeller 220 and the intermediate surface 216 of the upper housing 211. The friction may disturb the impeller 200 which is rotated by the water pressure.

In order to avoid such a problem at an early stage of the power generation, two communication holes 270 are disposed in the intermediate surface 216 of the upper housing 211, with the through-hole 217 positioned at the center thereof. FIG. 5 illustrates the structure.

Through the communication holes 270, water may communicate between the space 221 of the upper housing 211 and the space 241 of the lower housing 250, which makes it possible to prevent defects caused by the inclination of the impeller 220 at the early stage of the power generation.

When a plurality of communication holes 270 are formed, the pressure differential, during at the early stage, may be effectively removed. More desirably, two communication holes may be disposed symmetrically with each other. When the number of communication holes increases, an excessive flow rate loss and an increase of flow rate to the inside may occur. In this case, flow path resistance increases and serves as a load.

The communication hole 270 may be formed to have a diameter of about 1-1.5 mm. When the diameter of the communication hole 270 is less than 1 mm, it is difficult for water to communicate through the communication hole 270. When the diameter of the communication hole 270 is more than 1.5 mm, the flow rate to the space 241 of the lower housing 250 may increase. In this case, flow path resistance increases and serves as a load.

In the second embodiment of the present invention, the lower housing 250 is positioned under the upper housing 211, with the seal 218 interposed therebetween. The magnet 240 connected to the rotating shaft 230 is positioned in the space 241 of the lower housing 250.

The magnet 240 is coupled to the rotating shaft 230 such that they may be rotated integrally. As the impeller 220 is rotated, the impeller 220 and the magnet 240 are rotated together. Furthermore, the magnet 240 is coupled to the rotating shaft 230 at a position corresponding to the bobbin 251 inside the lower housing 250.

Now, a self-power generating type bidet in which the generator 100 according to the first embodiment of the present invention is mounted will be described.

Referring to FIG. 6, the generator 100 according to the embodiment of the present invention is positioned inside a bidet body 500, and the water inlet 112 of the generator 100 communicates with a pipe 300 inside the wall of a toilet. As illustrated in FIG. 3, the water outlet 113 of the generator 100 is divided into the first and second water outlets 114 and 115.

The first water outlet 114 communicates with a ceramic tank 310. When a user flushes the toilet after a bowel movement, water from the pipe 300 passes through the generator 100, and then flows into the ceramic tank 310.

Meanwhile, the second water outlet 115 communicates with a flow path switching device 320 which selectively communicates with a cleaning nozzle 330 or a bidet nozzle 340 inside the bidet body 500. The flow path switching device 320 may be constructed in various manners, and various types of flow path switching devices have already been disclosed. Therefore, detailed descriptions thereof will be omitted.

In the generator 100 according to the embodiment of the present invention, the second water outlet 115 communicates with the flow path switching device 320 which selectively communicates with the cleaning nozzle 330 or the bidet nozzle 340. Therefore, when cleaning is performed or the bidet is used, water injected to the nozzle is supplied through the generator 100. Therefore, power generation may be performed when the user flushes the toilet as well as when the water is used for cleaning.

Furthermore, the bidet body 500 includes a charge unit 410 and a control unit 400. The charge unit 410 serves to store the power generated by the generator 100. The control unit 400 receives power from the charge unit 410 and controls the flow path switching device 320 and the cleaning and bidet nozzles 330 and 340 which are injection nozzles. The control unit 400 controls the flow path switching device 320, the cleaning nozzle 330, and the bidet nozzle 340 by using the power charged from the generator 100.

FIG. 6 shows an example in which the control unit 400 and the charge unit 410 are separately provided. However, the control unit 400 and the charge unit 410 may be integrated on a single board.

In the embodiment of the present invention, the first water outlet 114 communicating with the ceramic tank 310 is formed to have a larger internal diameter than the second water outlet 115 communicating with the flow path switching device 320 of the bidet body 500. A larger amount of water needs to be supplied to the ceramic tank 310 than the flow path switching device 320 of the bidet body 500, and parts inside the bidet body 500 have less resistance to high water pressure than the ceramic tank 310. Therefore, when the diameter of the first water outlet 114 communicating with the ceramic tank 310 is set to be larger than that of the second water outlet 115 communicating with the flow path switching device 320 of the bidet body 500, it is possible to reduce the pressure of water supplied to the second water outlet.

The ratio of the inner diameter of the second water outlet 115 and the inner diameter of the first water outlet 114 may be set to 1:1.2-5. When the internal diameter of the first water outlet 114 is 1.2 times smaller than that of the second water outlet 115, original water pressure supplied to the second water outlet 115 becomes high. In this case, parts installed in the nozzle flow path may be damaged, or the lifespan thereof may be reduced. On the other hand, when the inner diameter of the first water outlet 114 is five times larger than that of the second water outlet 115, the internal diameter of the first water outlet 114 is excessively reduced in comparison with the internal diameter of the second water outlet 115. In this case, injection may not be performed normally in the cleaning nozzle 330 or the bidet nozzle 340, while the bidet is used. Furthermore, since the flow rate of original water discharged in the power generation process using the cleaning nozzle 330 or the bidet nozzle 340 is too small, the power generation may not be performed sufficiently.

FIG. 6 shows an example in which the generator 100 according to the first embodiment of the present invention is applied to the bidet body 500. However, the generator 100 according to the second embodiment of the present invention may be applied to the bidet body 500.

While the present invention has been shown and described in connection with the exemplary embodiments, it will be apparent to those skilled in the art that modifications and variations can be made without departing from the spirit and scope of the invention as defined by the appended claims.

The invention claimed is:

1. A generator comprising:
   an upper housing and a lower housing;
   a water inlet and a water outlet provided in the upper housing;
   an impeller rotatably fixed inside the upper housing;
   a magnet provided in the lower housing, connected to a rotating shaft of the impeller, and rotated integrally with the impeller; and
   a bobbin positioned outside the magnet,
   wherein a through-hole through which the rotating shaft passes is formed in the upper housing to have a larger diameter than the rotating shaft,
   wherein water flows from a space for housing the impeller into a space of a lower housing for housing the magnet, through a gap between the through-hole and the rotating shaft, and
   wherein the bobbin is formed integrally in the lower housing by injection molding.

2. The generator of claim 1, wherein a bearing is disposed at the through-hole and one or more communication holes connecting the space for housing the impeller to the space for housing the magnet are disposed in an intermediate surface between the space for housing the impeller and the space for housing the magnet.

3. The generator of claim 2, wherein the communication holes have a diameter of 1-1.5 mm.

4. The generator of claim 1, wherein a bottom portion of the lower housing formed integrally with the bobbin has a larger thickness than a distance between the bobbin and the magnet in the lower housing.

5. The generator of claim 4, wherein the distance between the bobbin and the magnet in the lower housing formed integrally with the bobbin is between 0.5-1 mm.

6. The generator of claim 4, wherein the bottom portion of the lower housing formed integrally with the bobbin is formed to a thickness of 2 mm or more.

7. The generator of claim 1, wherein the water outlet is divided into two or more parts such that water passing through the generator is supplied through the divided water outlets.

8. A bidet comprising a bidet body, wherein the bidet body comprises:
   a generator;
   an injection nozzle connected to a water outlet of the generator, receiving water from the water outlet of the generator, and injecting the received water;
   a charge unit storing power from the generator; and
   a control unit receiving power from the charge unit and controlling the injection nozzle,
   wherein the generator comprises:
      an upper housing and a lower housing;
      a water inlet and the water outlet provided in the upper housing;
      an impeller rotatably fixed in the upper housing;
      a magnet provided in the lower housing, connected to a rotating shaft of the impeller, and rotated integrally with the impeller; and
      a bobbin positioned outside the magnet, and
   wherein a through-hole through which the rotating shaft passes is formed in the upper housing having a larger diameter than the rotating shaft,
   wherein water flows from a space for housing the impeller into a space of a lower housing for housing the magnet, through a gap between the through-hole and the rotating shaft, and
   wherein the bobbin is formed integrally in the lower housing by injection molding.

9. The bidet of claim 8, wherein a bearing is disposed at the through-hole and one or more communication holes connecting the space for housing the impeller to the space for housing the magnet are disposed in an intermediate surface between the space for housing the impeller and the space for housing the magnet.

10. The bidet of claim 9, wherein the injection nozzle comprises a bidet nozzle and a cleaning nozzle, the bidet body further comprises a flow path switching device provided between the generator and the bidet and cleaning nozzles and switching paths of the bidet and cleaning nozzles, and the control unit controls the flow path switching device with the injection nozzle.

11. The bidet of claim 9, wherein the water inlet is connected to a pipe of a toilet, and the water outlet is divided into a first water outlet for supplying water to a toilet tank and a second water outlet for supplying water to the injection nozzle.

12. The bidet of claim 11, wherein the first water outlet connected to the toilet tank has a larger inner diameter than the second water outlet connected to the injection nozzle.

13. The bidet of claim 11, wherein the ratio of the inner diameter of the first water outlet connected to the toilet tank and the inner diameter of the second water outlet connected to the injection nozzle is 1:1.2-5.

* * * * *